US008460496B2

(12) United States Patent
Casey et al.

(10) Patent No.: US 8,460,496 B2
(45) Date of Patent: Jun. 11, 2013

(54) METHOD AND SYSTEM FOR PRODUCING CORRUGATED MATERIAL

(75) Inventors: David W. Casey, Salisbury, NC (US); Gregg A. Bryan, Mooresville, NC (US); Karl U. Wuerminghausen, Canton, OH (US)

(73) Assignee: Greif Packaging LLC, Delaware, OH (US)

(*) Notice: Subject to any disclaimer, the term of this patent is extended or adjusted under 35 U.S.C. 154(b) by 233 days.

(21) Appl. No.: 13/034,451

(22) Filed: Feb. 24, 2011

(65) Prior Publication Data

US 2011/0209809 A1 Sep. 1, 2011

Related U.S. Application Data

(60) Provisional application No. 61/309,230, filed on Mar. 1, 2010.

(51) Int. Cl.
*B31F 1/20* (2006.01)
*B32B 38/04* (2006.01)

(52) U.S. Cl.
USPC ............ 156/207; 156/257; 156/268; 156/580

(58) Field of Classification Search
None
See application file for complete search history.

(56) References Cited

U.S. PATENT DOCUMENTS

| | | | | |
|---|---|---|---|---|
| 3,841,944 | A * | 10/1974 | Harris, Jr. | 156/504 |
| 4,419,173 | A * | 12/1983 | Akiyama et al. | 156/470 |
| 5,245,897 | A | 9/1993 | Arnold et al. | |
| 2002/0071937 | A1 | 6/2002 | Smith et al. | |
| 2007/0144322 | A1* | 6/2007 | Niedermeyer | 83/53 |

FOREIGN PATENT DOCUMENTS

JP 55035749 A * 3/1980

* cited by examiner

*Primary Examiner* — Barbara J Musser
(74) *Attorney, Agent, or Firm* — Sand & Sebolt

(57) ABSTRACT

A method and system for automatically changing the flute size in a corrugation process without stopping or slowing the overall corrugation process utilizing a first single-faced web having a first flute size and a second single-faced web having a second flute size. The first single-faced web is conveyed along a track into a double backer forming a first corrugated material. When a flute change sequence is initiated, the single-faced web is cut using a pressurized stream of water such that the single-faced web disengages with the double backer. Generally simultaneously, the second single-faced web is introduced into the double backer using an air jet, wherein a second corrugated material is formed.

20 Claims, 8 Drawing Sheets

METHOD AND SYSTEM FOR PRODUCING CORRUGATED MATERIAL

CROSS REFERENCE TO RELATED APPLICATION

This application claims priority from U.S. Provisional Application Ser. No. 61/309,230 filed Mar. 1, 2010; the disclosure of which is incorporated herein by reference.

BACKGROUND OF THE INVENTION

1. Technical Field

The invention relates generally to a method and system for producing corrugated material. More particularly, the invention relates to automatically changing a flute size during the corrugation process. Particularly, the invention relates to cutting a single-faced web using a water jet as it travels along a track and into a double backer, while simultaneously introducing another single-faced web into the double backer using an air jet, without stopping or slowing the overall corrugation process and system.

2. Background Information

Corrugated paperboard is manufactured at very fast line speeds in corrugator machines which are well known in the industry. A typical corrugator machine includes at least one single-facer line which forms a single-faced web having a plurality of flutes with a particular flute size. The typical corrugator machine further includes a double backer which applies a second liner to the single-faced web to form a corrugated material, a scoring section for applying score cuts into the corrugated material, and a cutting section to divide the corrugated material into individual pieces.

In the single-facer line, corrugated flutes are formed transversely across a first material to form a corrugated web. A liquid adhesive is then applied to the tips of these flutes and the corrugated web is advanced. After the adhesive is applied, a second material is brought into contact with the glue-coated flutes to form a laminated single-faced web. The single-faced web is then conveyed through a bridge section which accumulates the single-faced web around bridge rollers for future use as needed. After the bridge section the single-faced web passes through a glue unit where an adhesive is delivered to the exposed flute tips of the single-faced web. Thereafter, both the single-faced web and a third material is delivered into the double backer, afterwhich the third material is applied to the exposed side of the single-faced web to form a corrugated material.

Generally, corrugated material is classified depending on the size of the flutes into A, B, C, and E flute classes, which have different heights and pitches, and which are selectively employed depending upon the desired uses. The flute size is determined by two abutting rollers which have their circumferential surfaces machined into a corrugated configuration with the first material being worked into the corrugated web. Inasmuch as these rollers are typically formed of metal which have been machined into the corrugated shape, different flute sizes require that the operator advances the first material through entirely different sets of rollers.

Many motors, sensors, and mechanical and electrical equipment must be started and brought online to begin the corrugation process. Therefore, it is extremely desirable to continuously run the corrugation machine to accomplish multiple jobs in succession. Typically, an entire batch of different jobs is run successively through the corrugation machine once the mechanical and electrical systems are online. Each job may require a different flute size corresponding to the desired finished corrugated material. While multiple single-facer lines are typically employed to provide a selection of flute sizes and single-faced webs, the corrugation process currently has to stop during a flute change sequence to insert the new single-faced web into the double backer. The process of slowing down and speeding up the corrugator machine before and after this stoppage is wholly inefficient as a significant amount of time is wasted, thereby decreasing production rates. Furthermore, the flute change sequence is currently done by hand, which represents a significant safety concern as rotating parts within the double backer are formed to continuously and forcefully pull material into the machine.

Therefore, a need exists for an improved method and system for producing corrugated material in which a user may automatically change the flute size without stopping or slowing down the overall corrugation process.

BRIEF SUMMARY OF THE INVENTION

Changing a flute size in a corrugation machine without stopping or slowing the double backer represents an enormous improvement in the art. Knives or other blade-type cutting tools break or tear the single-faced web when attempting to cut at the fast line speeds typically used in the art. Furthermore, blade-type cutting tools quickly become dull and require frequent replacement. By introducing a water jet cutting device, this problem is eliminated and the single-faced web may now cut at the line speed. Furthermore, by introducing an air table, the single-faced web may now be fed into the double backer without compromising the safety of a user, as previously the single-faced web was manually fed into the double backer during a flute change. By automating the processes of cutting the old single-faced web and feeding the new single-faced web into the double backer, the entire corrugation process may be run at full line speed during a flute change sequence.

The present invention focuses on an improved method and system for producing corrugated material comprising the steps of: forming a single-faced web of corrugated material having a first edge and a spaced apart second edge; conveying the single-faced web along a track; providing an air stream to convey a portion of the single-faced web off the track and towards a double backer; engaging the portion with the double backer, whereby the double backer pulls the single-faced web into the double backer and begins producing a corrugated material; applying a cut through the first edge of the single-faced web to form a cut portion of the single-faced web; stopping conveying of the single-faced web along the track; and continuing to pull the generally immobile single-faced web into the double backer whereby the single-faced web separates completely from the first edge to the second edge generally proximate the cut portion.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

Similar numbers refer to similar parts throughout the drawings.

DETAILED DESCRIPTION OF THE INVENTION

A corrugation system for carrying out the method of the present invention is represented generally at 1, and shown in FIGS. 1-11. As shown particularly in FIG. 1, corrugation system 1 includes a first single facer line 3 and second single facer line 4. Single facer lines 3 and 4 are substantially identical and positioned to operate in a complementary fashion, as discussed in detail below. However, inasmuch as the preferred embodiment of corrugation system 1 includes two single facer lines 3 and 4, corrugation system 1 need not be limited to two single facer lines and the present invention may encompass as many single facer lines as necessary or desired.

Figure 1:
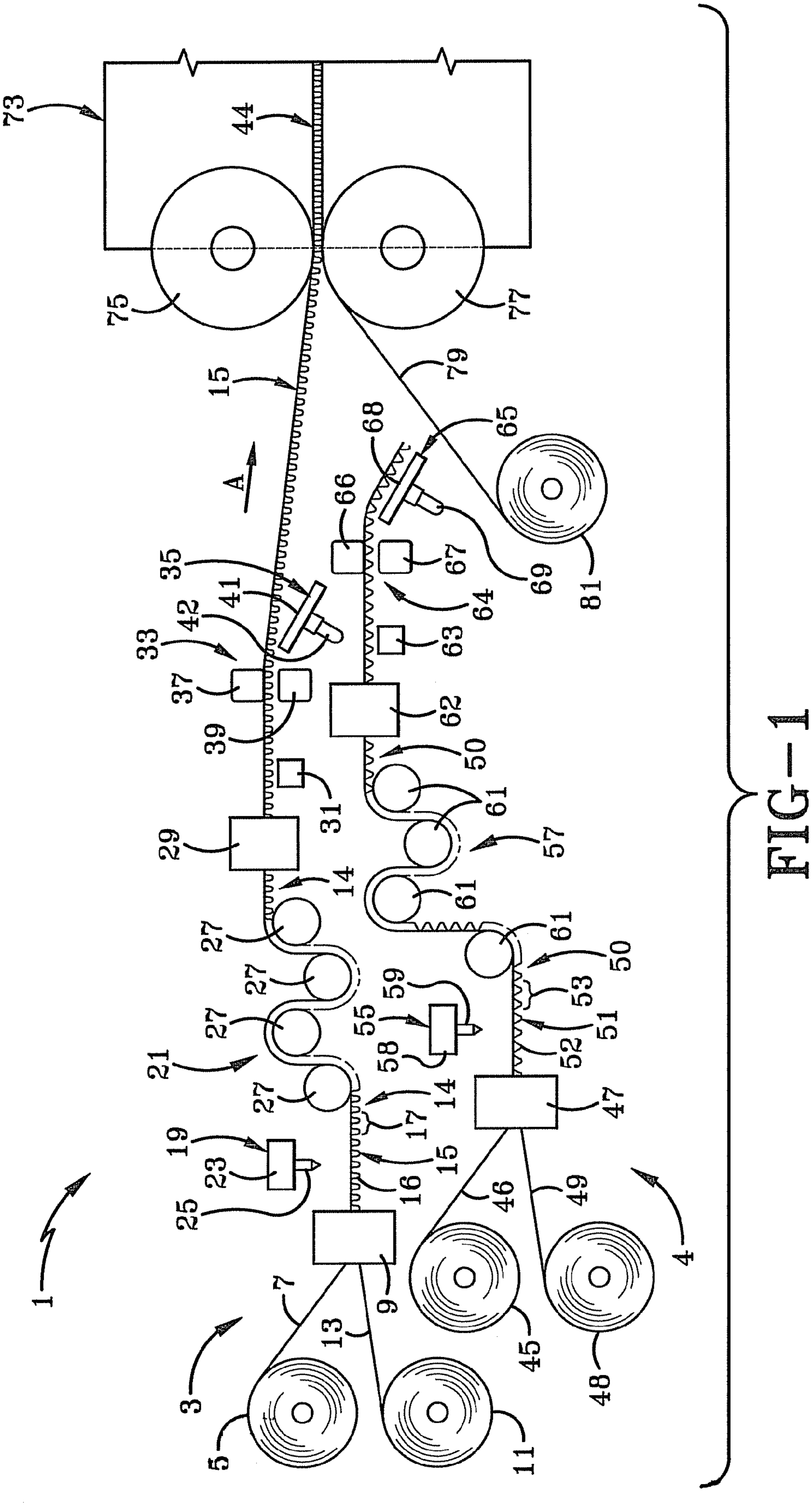
FIG. 1 is a side diagrammatic view of the system for carrying out the method of the present invention, with the first single facer line being conveyed into the double backer and the double backer producing a first corrugated material from the first single-faced web.

As shown in FIG. 1, first single facer line 3 includes a first roll 5 of paper-based material 7 which is rotated off first roll 5 into a single-facer 9. First single facer line 3 further includes a second roll 11 of paper-based material 13 which is rotated off second roll 11 and into single-facer 9. Single-facer 9 forms a first single-faced web 15 of corrugated material out of paper-based materials 7 and 13. First single-faced web 15 includes a first edge 18 and a spaced apart second edge 20 (FIG. 3), and a plurality of flutes 16, each having a uniform flute size 17. Single-facer 9 outputs first single-faced web 15 onto a track 14, which conveys first single-faced web 15 through the remaining portion of first single facer line 3.

Figure 2:
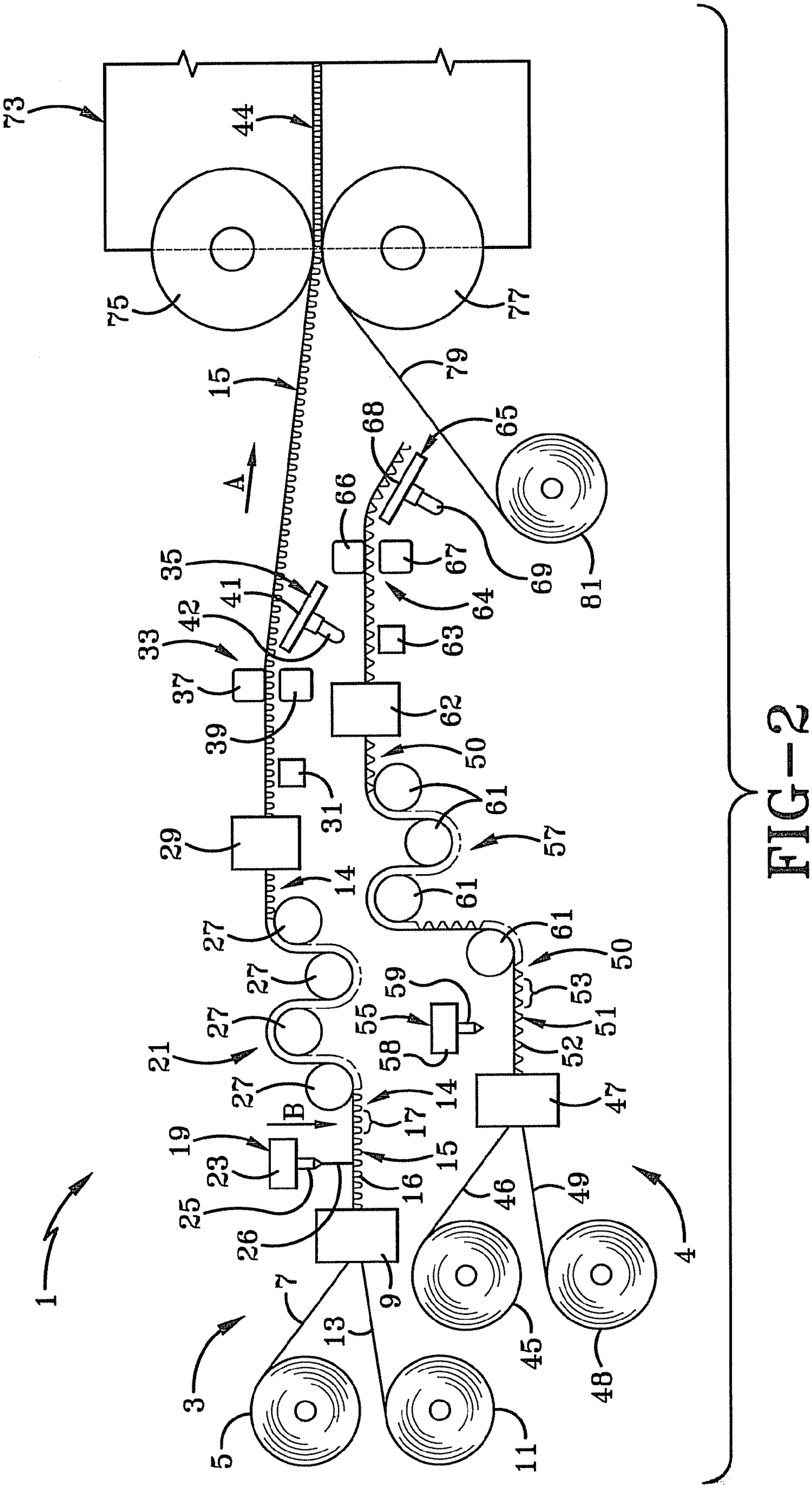
FIG. 2 is a view similar to FIG. 1, with the water jet cutting device expelling a stream of water.
Figure 6:
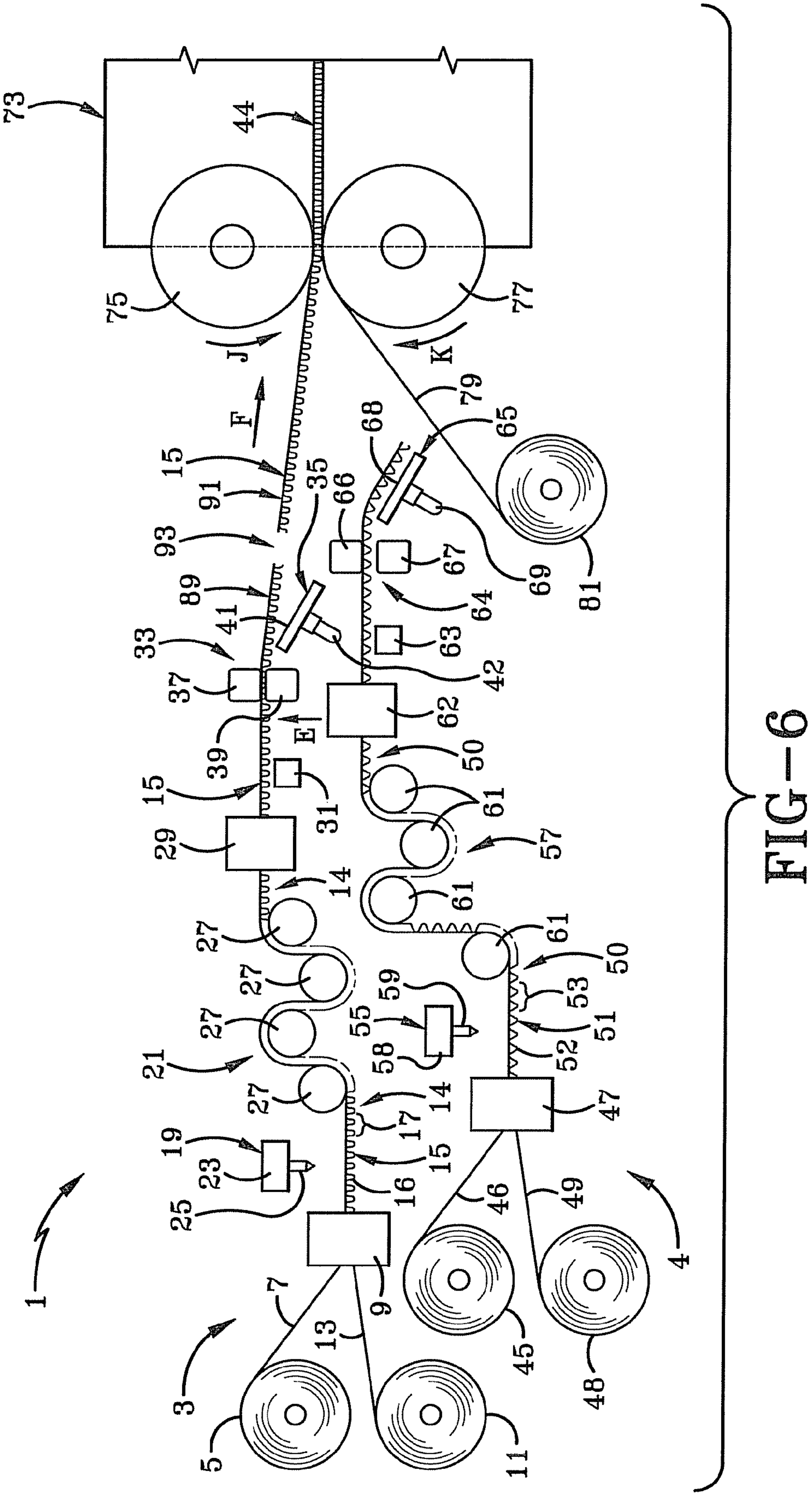
FIG. 6 is a diagrammatic side plan view similar to FIG. 1, with the first single-faced web separated into two portions.

As shown in FIG. 1, first single facer line 3 further includes a water jet cutting device 19, a bridge section 21, a glue unit 29, a sensor 31, a clamp 33, and an air table 35. Water jet cutting device 19 includes a cutting track 23 (FIG. 3) and a nozzle 25 movable along cutting track 23 for delivering a pressurized water stream 26 (FIG. 2). Bridge section 21 includes a plurality of bridge rollers 27 offset from one another and disposed to direct first single-faced web 15 into glue unit 29. A clamp mechanism 33 is movable between an open position (FIG. 1) and a closed position (FIG. 6), and includes a first clamp bar 37 and a second clamp bar 39. In the open position, first clamp bar 37 is distal from second clamp bar 39 (FIG. 1). In the closed position, first clamp bar 37 is proximate second clamp bar 39 (FIG. 6). An air table 35 is located downstream from clamp mechanism 33 and includes a top surface 41 and an air hose 42 connected to an air delivery device (not shown).

As shown in FIG. 1, second single facer line 4 includes a first roll 45 of paper-based material 46 which is rotated off first roll 45 into a single-facer 47. Second single facer line 4 further includes a second roll 48 of paper-based material 49 which is rotated off second roll 48 and into single-facer 47. Single-facer 47 forms a second single-faced web 51 of corrugated material out of paper-based materials 46 and 49. Second single-faced web 51 includes a plurality of flutes 52, each having a uniform flute size 53. Single-facer 47 outputs second single-faced web 51 onto a track 50, which conveys second single-faced web 51 through the remaining portion of second single facer line 4.

As shown in FIG. 1, second single facer line 4 further includes a water jet cutting device 55, a bridge section 57, a glue unit 62, a sensor 63, a clamp mechanism 64, and an air table 65. Water jet cutting device 55 includes a cutting track 58 and a nozzle 59 movable along cutting track 58, and delivers a pressurized stream of water (not shown) similar to water jet cutting device 19. Bridge section 57 includes a plurality of bridge rollers 61 offset from one another and disposed to direct second single-faced web 51 into glue unit 62. Clamp mechanism 64 is movable between an open position and a closed position, and includes a first clamp bar 66 and a second clamp bar 67. In the open position, first clamp bar 66 is distal from second clamp bar 67. In the closed position, first clamp bar 66 is proximate second clamp bar 67. Air table 65 includes a top surface 68 which is formed with a plurality of openings 43 (FIG. 8) to enable an air stream 71 (FIG. 9) to pass through surface 68. Air stream 71 is delivered by an air hose 69 connected to a usual air delivery device (not shown).

As shown in FIG. 1, corrugation system 1 further includes a double backer 73. Double backer 73 includes a first inlet roller 75 and a second inlet roller 77, and is sized and positioned to receive first single-faced web 15 from first single facer line 3, or alternatively second single-faced web 51 from second single facer line 4. Corrugation system 1 further includes a paper-based material 79 which is rotated off a third roll 81 and into double backer 73, wherein material 79 is adhered to first single faced web 15 or second single faced web 51 to form corrugated material 44 or corrugated material 83, respectively.

Figure 11:
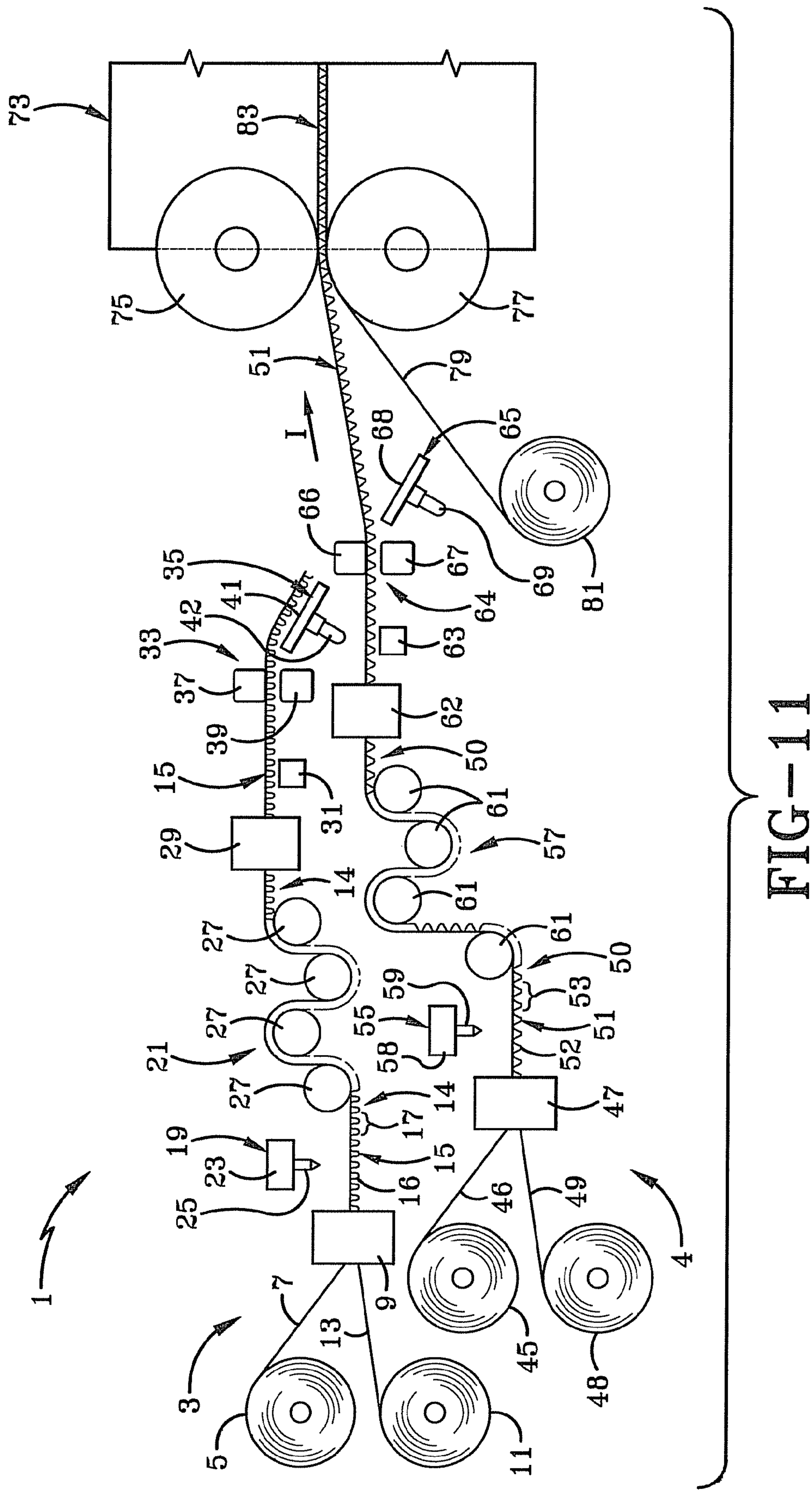
FIG. 11 is a view similar to FIGS. 9 and 10 showing the second single facer line being conveyed into the double backer and the double backer producing a second corrugated material from the second single-faced web.

In operation, either first single-faced web 15 formed by first single facer line 3, or second single-faced web 51 formed by second single facer line 4 is conveyed into double backer 73. Double backer 73 combines either first single-faced web 15 or second single-faced web 51 with material 79 to produce either a corrugated material 44 (FIG. 1) or a corrugated material 83 (FIG. 11). As first single-faced web 15 includes flute size 17, the resulting corrugated material 44 includes flute size 17 (FIG. 1). Likewise, as second single-faced web 51 includes flute size 53, the resulting corrugated material 83 includes flute size 53 (FIG. 11). When the user desires to change which first single-faced web 15 or 51 enters double backer 73, a flute change sequence is initiated whereby the active first single facer line 3 or 4 stops conveying first single-faced web 15 or 51, respectively, into double backer 73. At the same general time, the inactive first single facer line 3 or 4 starts conveying first single-faced web 15 or 51, respectively, into double backer 73.

FIGS. 1-11 illustrate the following flute change sequence from flute size 17 to flute size 53. As shown in FIG. 1, first single facer line 3 is active, conveying first single-faced web 15 into double backer 73, while second single facer line 4 is not active, and not conveying second single-faced web 51 into double backer 73. When a flute change sequence is initiated, a signal is sent to water jet cutting device 19, whereby water jet cutting device 19 cuts across first single-faced web 15 in response to receiving the signal. The signal may be transmitted by a hard-wired system or a wireless system or any system well know in the art. As shown in FIG. 2, when water jet cutting device 19 receives an appropriate signal, water stream 26 is expelled from nozzle 25 in the direction of Arrow B, severing first single-faced web 15.

Figure 3:
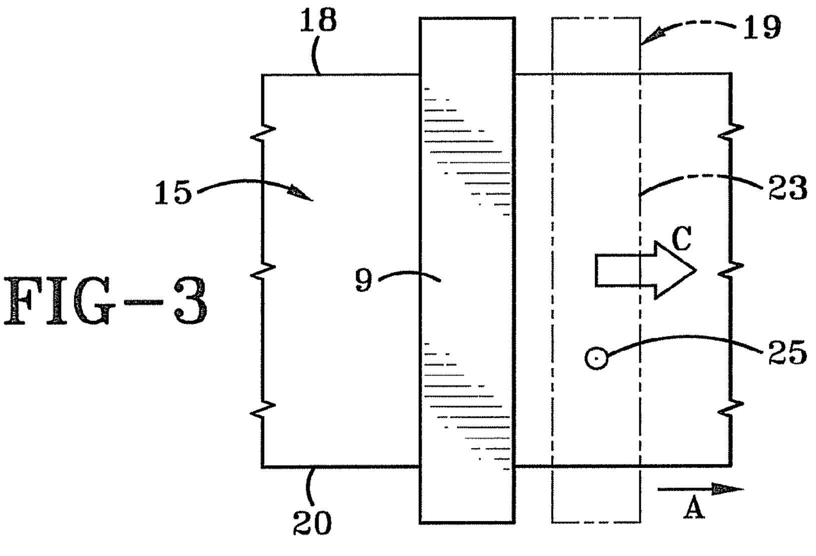
FIG. 3 is a fragmentary top plan view of the single-facer and water jet cutting device of the present invention, with the cutting track shown in phantom.
Figure 4:
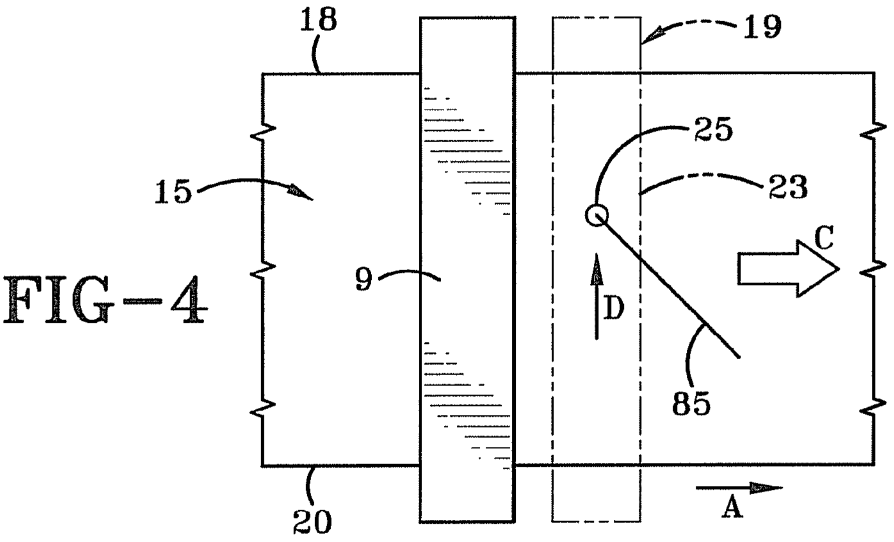
FIG. 4 is a top plan view similar to FIG. 3 with a cut extending through part of the first single-faced web.
Figure 5:
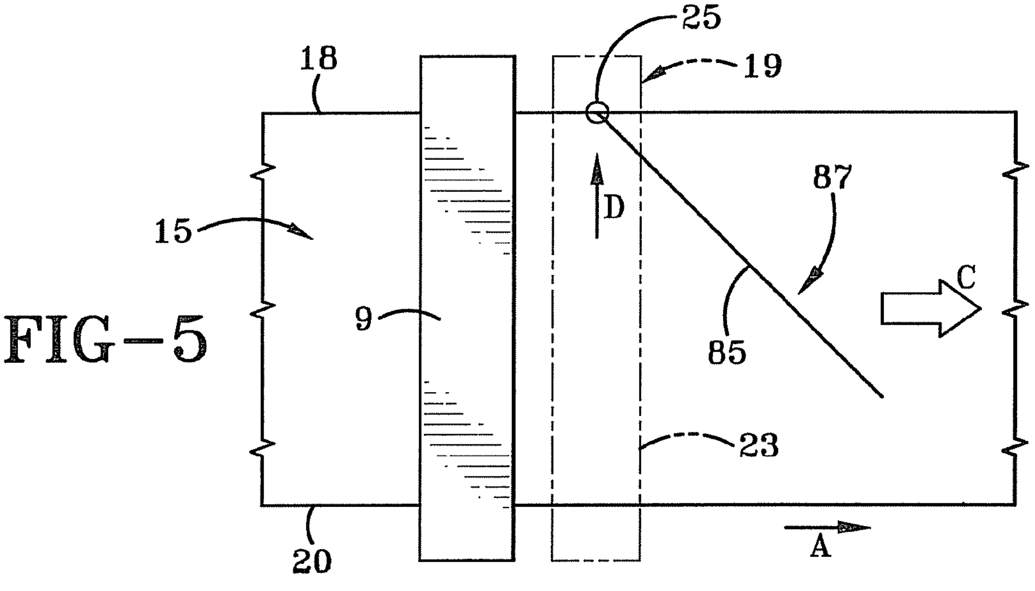
FIG. 5 is a top plan view similar to FIGS. 3 and 4 with the cut extending through the first edge of the first single-faced web.
Figure 7:
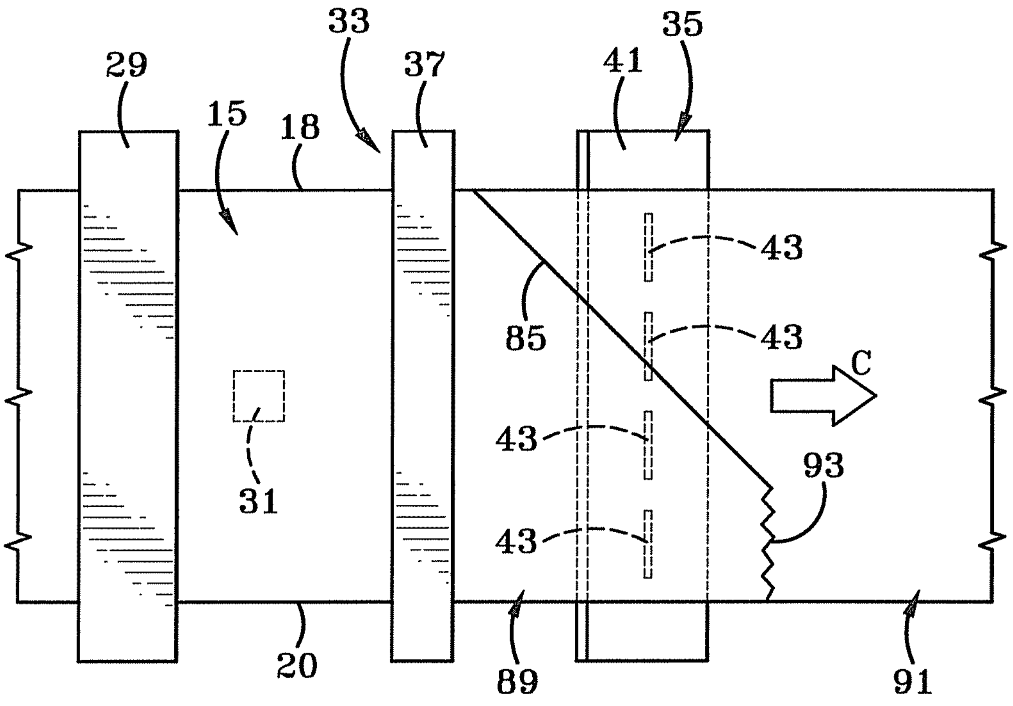
FIG. 7 is a fragmentary top plan view of the glue unit, clamp, and air table of the present invention, with the sensor shown in phantom, and the first single-faced web separated into two portions.
Figure 8:
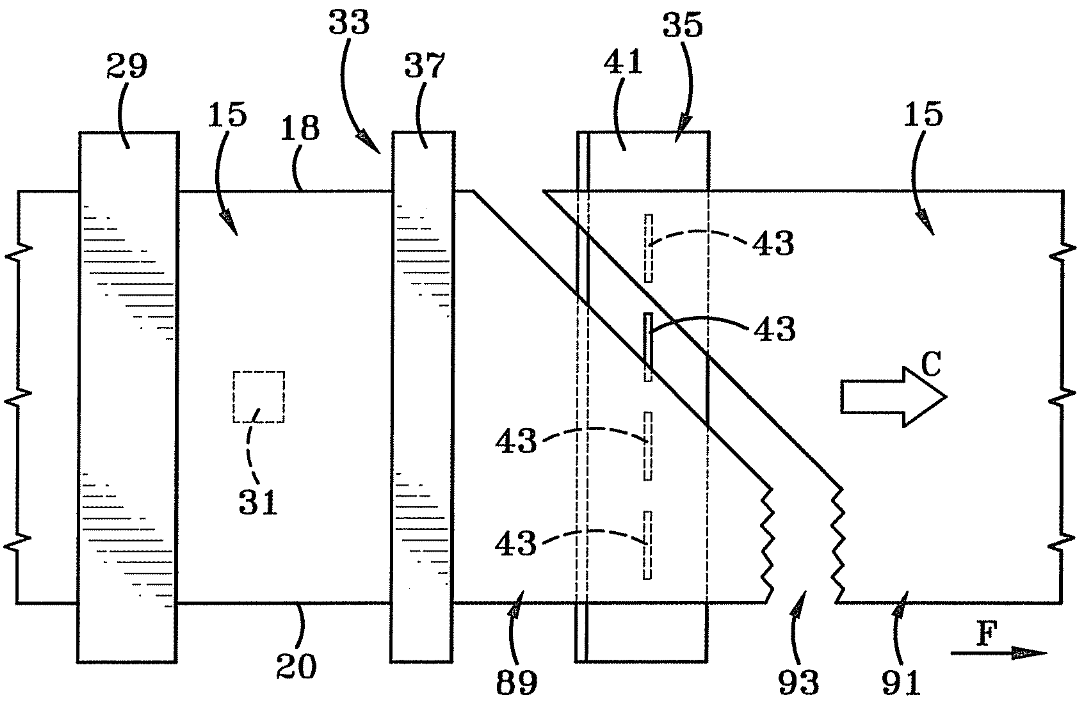
FIG. 8 is a view similar to FIG. 7 with the two separated portions further apart.

As shown in FIGS. 3-5, first single-faced web 15 is cut by water stream 26. Reference Arrow C is shown as a reference for illustrating the relative movement of first single-faced web 15 past water jet cutting device 19. Nozzle 25 is disposed on cutting track 23, whereby cutting track 23 extends over the entire width of first single-faced web 15. As shown in FIG. 3, nozzle 25 is offset from second edge 20 when nozzle 25 begins expelling water stream 26. As shown in FIG. 4, nozzle 25 moves along the cutting track in the direction of Arrow D, continuing to expel water stream 26 through first single-faced web 15. As shown in FIG. 5, nozzle 25 continues to move along cutting track in the direction of Arrow D expelling water stream 26 through first single-faced web 15 until first single-faced web 15 is severed through first edge 18, thereby forming a cut 85 in first single-faced web 15 and disposed in a general cut portion 87 area. As shown in FIGS. 7 and 8, cutting track 23 extends generally perpendicularly to first edge 18 and thus nozzle 25 moves perpendicularly across first single-faced web 15 in the direction of Arrow D when applying cut 85. However, as shown in FIGS. 4 and 5, cut 85 extends generally diagonally from first edge 18 toward second edge 20 as a result of the movement of first single-faced web 15 along track 14, as illustrated by Arrow C.

As shown in FIGS. 6-8, after cut 85 is applied to first single-faced web 15 it continues to be conveyed along track 14 past sensor 31 and through clamp mechanism 33 which is in the open position. Sensor 31 monitors first single-faced web 15 and senses when cut portion 87 passes thereby. When sensor 31 senses that cut portion 87 has passed thereby, a signal is sent to clamp mechanism 33, which then moves from the open position to the closed position. As shown in FIG. 6, to move from the open position to the closed position, second clamp bar 39 moves in the direction of Arrow E to clamp web 15 between second clamp bar 39 and first clamp bar 37 preventing web 15 from being conveyed further along track 14. However, double backer 73 continues to pull the severed portion of first single-faced web 15 in the direction of Arrow F by first inlet roller 75 rotating in the direction of Arrow J and second inlet roller 77 rotating in the direction of Arrow K with first single-faced web 15 being disposed therebetween. The pulling on first single-faced web 15 by double backer 73 increases tension on first single-faced web 15, primarily on cut portion 87 disposed between clamp 33 and double backer 73. The tension increases until a tear 93 is formed in first single-faced web 15 such that first single-faced web 15 separates into a first portion 89 and a separate second portion 91 (FIG. 6), whereby second portion 91 continues through double backer 73 and first portion 89 remains on track 14.

Referring to FIGS. 6-8, it will be readily understood that cut portion 87 is the weakest portion of first single-faced web 15 due to cut 85. As such, sensor 31 and clamp mechanism 33 are operationally connected and configured such that clamp mechanism 33 moves from the open position to the closed position immediately after cut portion 87 passes therethrough to position cut portion 87 intermediate clamp mechanism 33 and double backer 73 (FIG. 6). This ensures a controlled separation of first single-faced web 15 into first portion 89 and second portion 91 at generally the area of cut portion 87.

Figure 9:
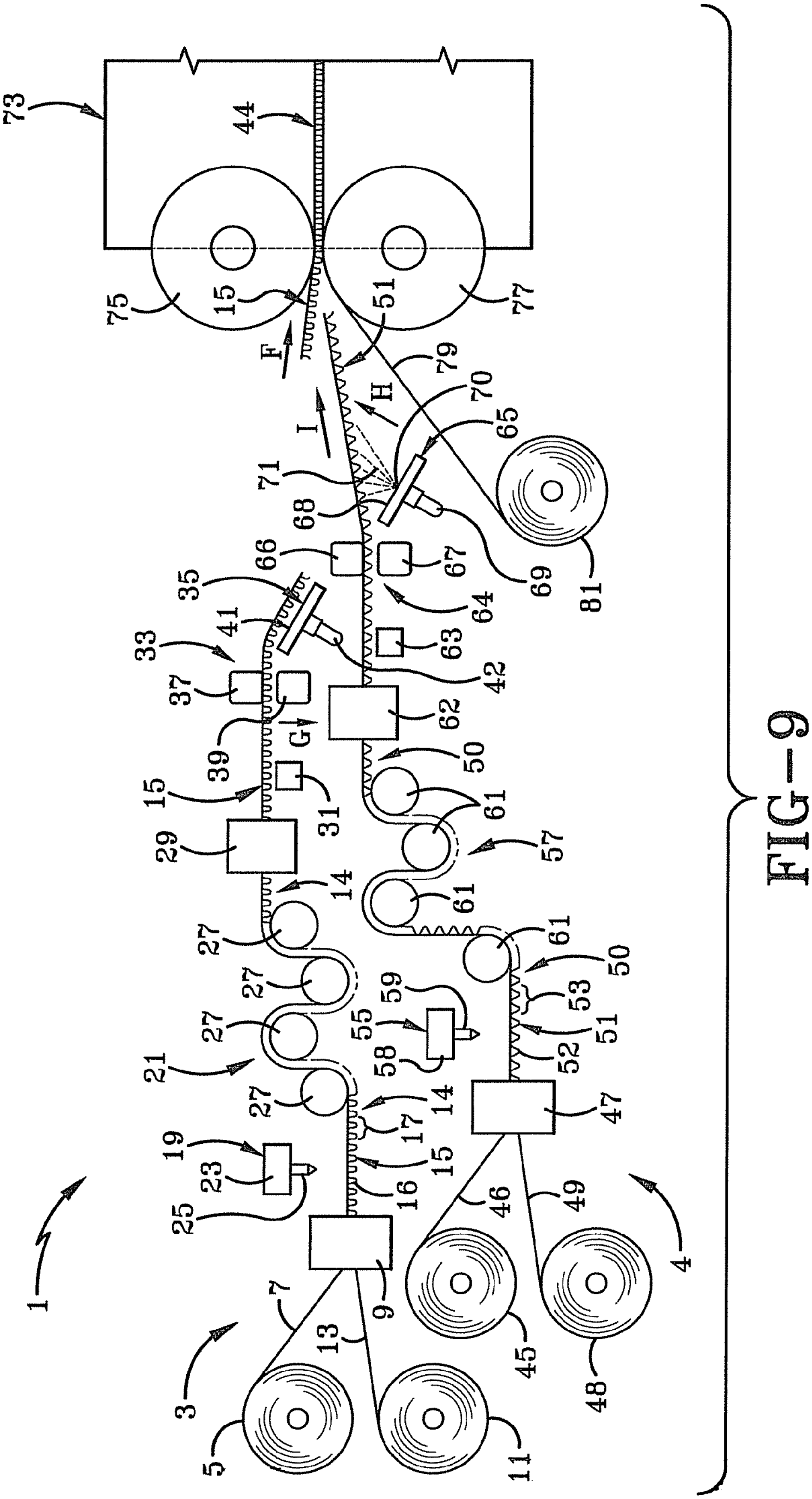
FIG. 9 is a diagrammatic side plan view showing the air table of the second single-facer line expelling an air stream and conveying a second single-faced web towards the double backer.
Figure 10:
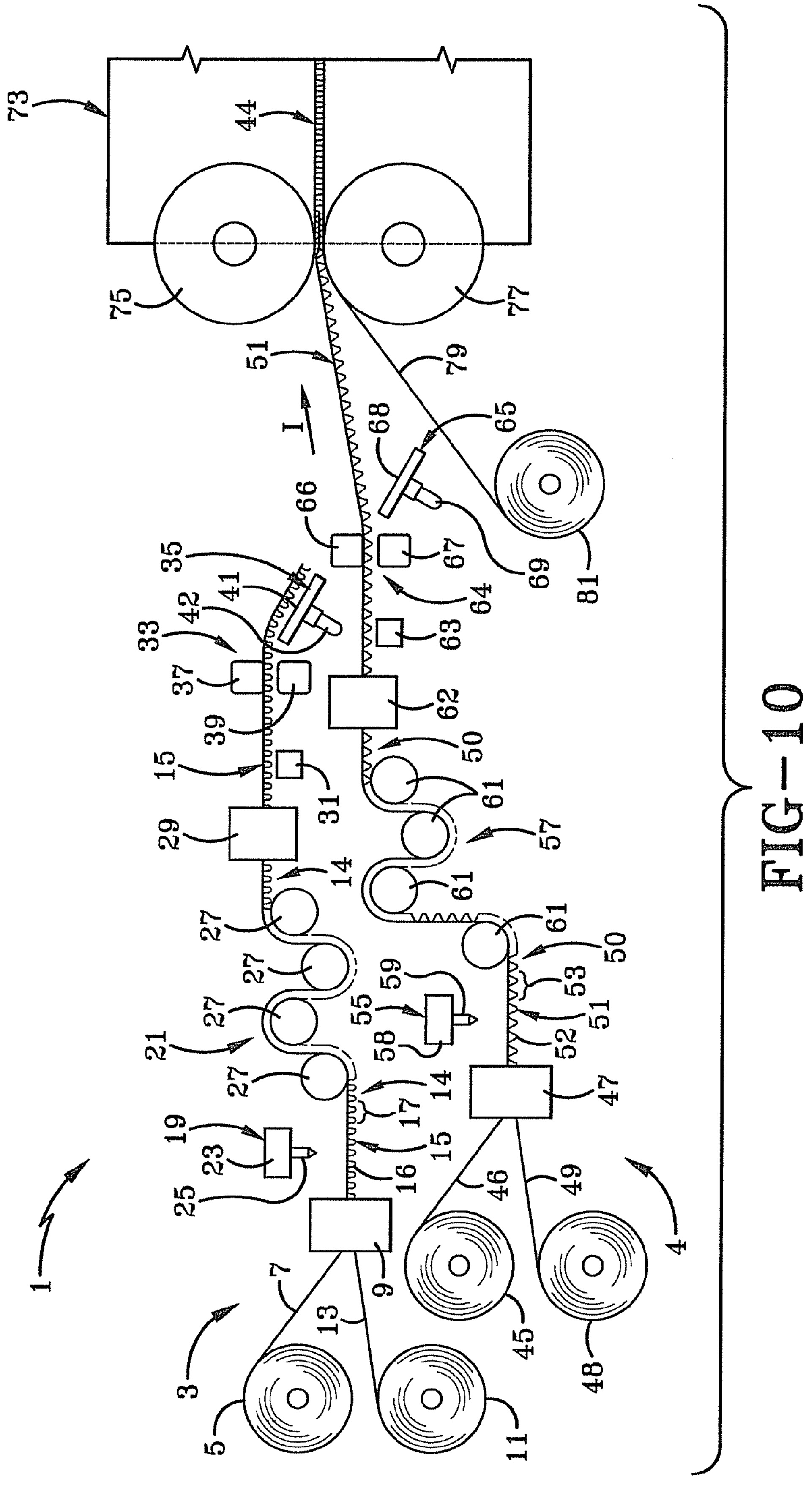
FIG. 10 is a view similar to FIG. 9 showing the second-single faced web engaging with the double backer.

As shown in FIGS. 7 and 8, the tension on first single-faced web 15 creates tear 93 generally between cut 85 and second edge 20, and the continued pulling on second portion 91 by double backer 73 advances second portion 91 away from first portion 89 (FIG. 8). As shown in FIG. 9, after first single-faced web 15 tears into first portion 89 and second portion 91, second clamp bar 39 moves in the direction of Arrow G to move clamp mechanism 33 from the closed position to the open position. Likewise, single facer 9 stops forming first single-faced web 15, and track 14 stops conveying first single-faced web 15. As first single facer line 3 stops and becomes inactive, first portion 89 is disposed over air table 35 (FIGS. 9-11). Thus, first single-faced web 15 is automatically separated from double backer 73 such that the need to manually separate first single-faced web 15 into two portions is eliminated.

At generally the same time first single facer line 3 is becoming inactive, second single facer line 4 is becoming active. FIGS. 9-11 show second single facer line 4 automatically conveying second single-faced web 51 into double backer 73 to produce corrugated material 83 having flute size 53. As shown in FIG. 6, second single-faced web 51 is disposed over air table 65. Single-facer 47 on second single facer line 4 starts to produce second single-faced web 51 and conveys second single-faced web 51 along track 50. At generally the same time, air table 65 blasts air stream 71 through openings 70, lifting second single-faced web 51 off air table 65 in the direction of Arrow H, as shown in FIG. 9. Openings 70 are formed in top surface 68 and are identical to openings 43, shown in FIGS. 7 and 8. Top surface 68 of air table 65 is disposed generally facing double backer 73 such that air stream 71 flowing out of openings 70 direct second single-faced web 51 towards double backer 73. The combined movement of track 50 conveying second single-faced web 51 along track 50 towards double backer 73, and air table 65 blasting air stream 71 such that second single-faced web 51 is lifted off track towards double backer 73, results in second single-faced web 51 being moved in the direction of Arrow I, directly into double backer 73.

As shown in FIG. 10, the rotational movement of first inlet roller 75 in the direction of Arrow J and second inlet roller 77 in the direction of Arrow K, cooperatively rotate inwardly relative double backer 73. Furthermore, material 79 is continuously being conveyed into double backer 73 such that material 79 essentially acts as a conveyer belt into double backer 73. As second single-faced web 51 is conveyed proximate double backer 73, first inlet roller 75 and second inlet roller 77, working in conjunction with material 79, lead second single-faced web 51 into double backer 73. As shown in FIG. 11, second single-faced web 51 is thereby pulled into double backer 73 wherein corrugated material 83 is formed having flute size 53. Thus, second single-faced web 51 is automatically inserted into double backer 73 such that the need to manually insert second single-faced web 51 into double backer 73 is eliminated, and the flute change sequence from flute size 17 to flute size 53 is complete.

Throughout the above described flute change process, double backer 73 is maintained at a constant speed which corresponds to the typical processing speed double backers use in the art to form corrugated material from a single-liner web.

The flute change process described herein is shown as changing from flute size 17 to flute size 53. It will be readily understood that to change from flute size 53 to flute size 17, the process is simply repeated with second single facer line 4 becoming inactive and first single facer line 3 becoming active. A user can readily change the flute size in the corrugation process without manually inserting a new single-faced web, and without slowing or stopping the corrugation process.

Water stream 26 is an important feature of the present invention because of the novel features inherent therein, particularly when used in the corrugation process. It will be readily understood in the art that the corrugation process can run at various line speeds depending on the particular job, such that first single-faced web 15 is conveyed past nozzle 25 at a wide range of different speeds. As such, there are substantial differences between water stream 26 and a blade-type cutting tool. A blade-type cutting tool must be synchronized with the line speed to direct the blade of the cutting tool into the passing single-faced web at precisely the angle to cut the single-faced web. If the blade is directed at the wrong angle, the force applied to the blade-type cutting tool by first single-faced web 15 will bend and break the cutting tool. Furthermore, the blade of the cutting tool will become dull over time and must be replaced, costing the user time and expense. Conversely, water stream 26 offers a 360° cutting capability and does not require synchronization with the line speed to ensure a cut. Furthermore, water stream 26 cannot dull or lose sharpness over time. Consequently, the water jet cutting device of the present invention is not structurally equivalent to a blade-type cutting tool.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A method for producing corrugated material comprising the steps of:
- forming a single-faced web of corrugated material having a first edge and a spaced apart second edge;
- conveying the single-faced web along a track;
- providing an air stream to convey a portion of the single-faced web off the track and towards a double backer;
- engaging the portion with the double backer, whereby the double backer pulls the single-faced web therein and begins producing a corrugated material therewith;
- applying a cut through the first edge of the single-faced web to form a cut portion of the single-faced web;
- preventing the cut from extending through the second edge;
- stopping conveying the single-faced web along the track; and
- continuing to pull the generally immobile single-faced web into the double backer whereby the single-faced web separates completely from the first edge to the second edge and generally proximate the cut portion.

2. The improved method of claim 1, further comprising the step of applying the cut through the single-faced web with a water jet cutting device.

3. The improved method of claim 2, further comprising the steps of:
- positioning the water jet cutting device on a cutting track, whereby the cutting track extends substantially across a width of the track;
- expelling a pressurized stream of water from the water jet cutting device towards the single-faced web;
- moving the water jet cutting device along the cutting track to cut across the single-faced web using the stream of water.

4. The improved method of claim 3, further comprising the step of sending a signal to the water jet cutting device, whereby the water jet cutting device cuts across the single-faced web in response to receiving the signal.

5. The improved method of claim 1, further comprising the steps of:
- providing the air stream from an air table having a top surface which defines a plurality of openings therein;
- expelling the air stream from the plurality of openings; and
- positioning the top surface to generally direct the air stream towards the double backer.

6. The improved method of claim 1, further comprising the steps of:
- providing a clamp along the track, whereby the clamp is movable between an open position and a closed position;
- conveying the single-faced web through the clamp; and
- sending a signal to the clamp, whereby the clamp moves from the open position to the closed position to prevent the single-faced web from passing therethrough in response to receiving the close signal.

7. The improved method of claim 6, further comprising the steps of:
- providing a sensor proximate the track; and
- sending the signal to the clamp when the sensor senses the cut portion has passed thereby.

8. The improved method of claim 1, further comprising the step of accumulating the single-faced web in a bridge roller section.

9. The improved method of claim 1, further comprising the steps of:
- providing a glue unit along the track;
- conveying the single-faced web through the glue unit; and
- applying a glue to a plurality of exposed flute tips on the single-faced web as the single-faced web passes through the glue unit.

10. A method for producing corrugated material comprising the steps of:
- forming a first single-faced web of corrugated material having a first edge and a spaced apart second edge;
- conveying the first single-faced web along a first track and through a clamp;
- providing a first air stream to convey a portion of the first single-faced web off the first track and towards a double backer;
- engaging the portion with the double backer, whereby the double backer pulls the first single-faced web therein and begins producing a first corrugated material therewith;
- applying a cut through the first edge of the single-faced web to form a cut portion of the first single-faced web;
- preventing the cut from extending through the second edge;
- moving the clamp from an open position to a closed position to prevent the first single-faced web from passing therethrough;
- pulling the generally immobile first single-faced web into the double backer whereby the first single-faced web separates completely from the first edge to the second edge and generally proximate the cut portion;

forming a second single-faced web of corrugated material having first edge and a spaced apart second edge;

conveying the second single-faced web along a second track;

providing a second air stream to convey a portion of the second single-faced web off the second track and towards the double backer; and engaging the portion with the double backer, whereby the double backer pulls the second single-faced web therein and begins producing a second corrugated material therewith.

11. The improved method of claim 10, further comprising the steps of:

forming the first single-faced web with a first flute size; and forming the second single-faced web with a second flute size, whereby the first flute size is different than the second flute size.

12. The improved method of claim 10, further comprising the step of applying the cut through the first single-faced web with a water jet cutting device.

13. The improved method of claim 12, further comprising the steps of:

positioning the water jet cutting device on a cutting track, whereby the cutting track extends substantially across a width of the first track; and moving the water jet cutting device along the cutting track to cut the first single-faced web.

14. The improved method of claim 13, further comprising the step of sending a signal to the water jet cutting device, whereby the water jet cutting device cuts the first single-faced web in response to receiving the signal.

15. The improved method of claim 10, further comprising the steps of:

generating the first air stream from a first air table having a first top surface which defines a first plurality of openings therein;

expelling the first air stream from the first plurality of openings;

positioning the first top surface to generally direct the first air stream towards the double backer;

generating the second air stream from a second air table having a second top surface which defines a second plurality of openings therein;

expelling the second air stream from the second plurality of openings; and positioning the second top surface to generally direct the second air stream towards the double backer.

16. A method of changing flute sizes in a corrugation process comprising the steps of:

forming a first single-faced web of corrugated material having a first flute size;

conveying the first single-faced web along a first track and into a double backer to form a first corrugated material having the first flute size;

applying a cut to the first single-faced web to form a cut portion of the first single-faced web;

stopping conveying the first single-faced web along the first track;

increasing tension on the first single-faced web, whereby the first single-faced web separates into a first portion and a second portion, and generally proximate the cut portion;

passing the second portion through the double backer;

maintaining the first portion on the first track;

forming a second single-faced web of corrugated material having a second flute size, whereby the second flute size is different from the first flute size;

conveying the second single-faced web along a second track;

providing an air stream to convey the second single-faced web off the second track and towards the double backer; and engaging the second single-faced web with the double backer, whereby the double backer pulls the second single-faced web therein and begins producing a second corrugated material having the second flute size.

17. The method of claim 16, further comprising the step of applying the cut through the first single-faced web with a water jet cutting device.

18. The method of claim 17, further comprising the steps of:

positioning the water jet cutting device on a cutting track, whereby the cutting track extends substantially across a width of the first track; and moving the water jet cutting device along the cutting track to cut the first single-faced web.

19. The method of claim 18, further comprising the step of sending a signal to the water jet cutting device, whereby the water jet cutting device cuts the first single-faced web in response to receiving the signal.

20. The improved method of claim 16, further comprising the steps of:

providing a sensor proximate the track; and stopping conveying the first single-faced web along the first track when the sensor senses the cut portion has passed thereby.

* * * * *